Figure 1:
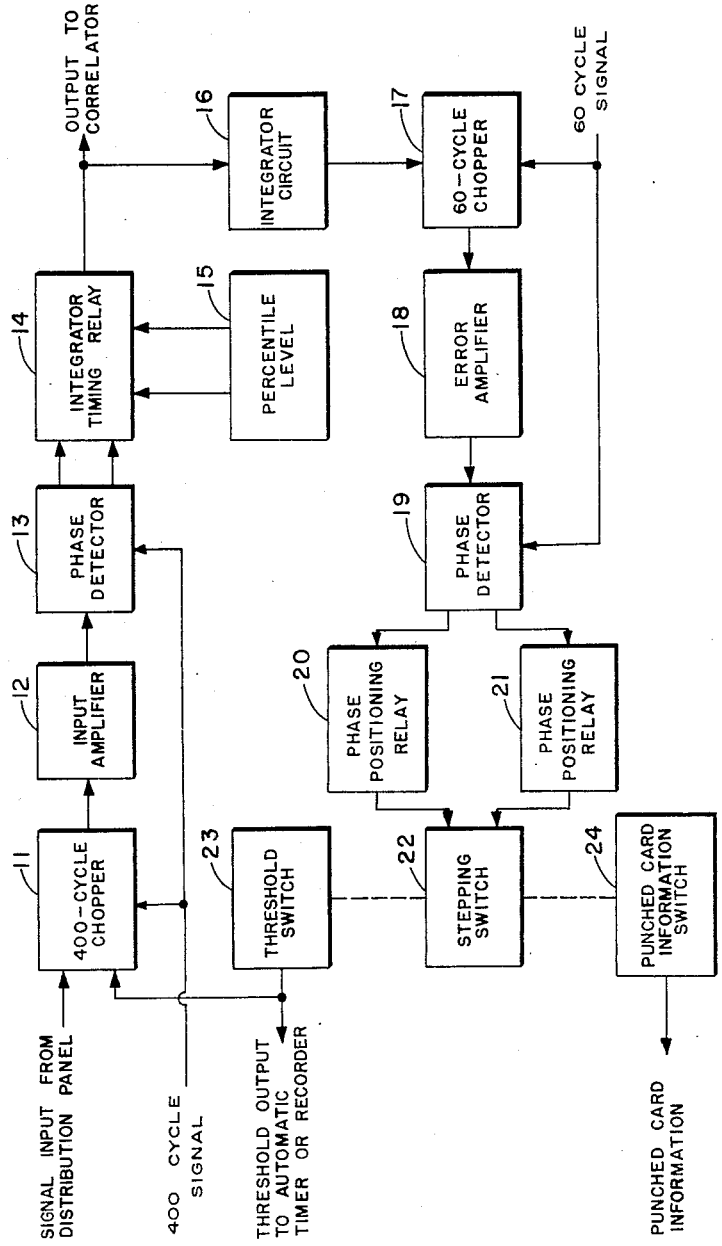

Sept. 22, 1959     C. S. CARNEY     2,905,888
AMPLITUDE DISTRIBUTION ANALYZER
Filed April 8, 1957     3 Sheets-Sheet 1

INVENTOR.
CHARLES S. CARNEY
BY
ATTORNEYS

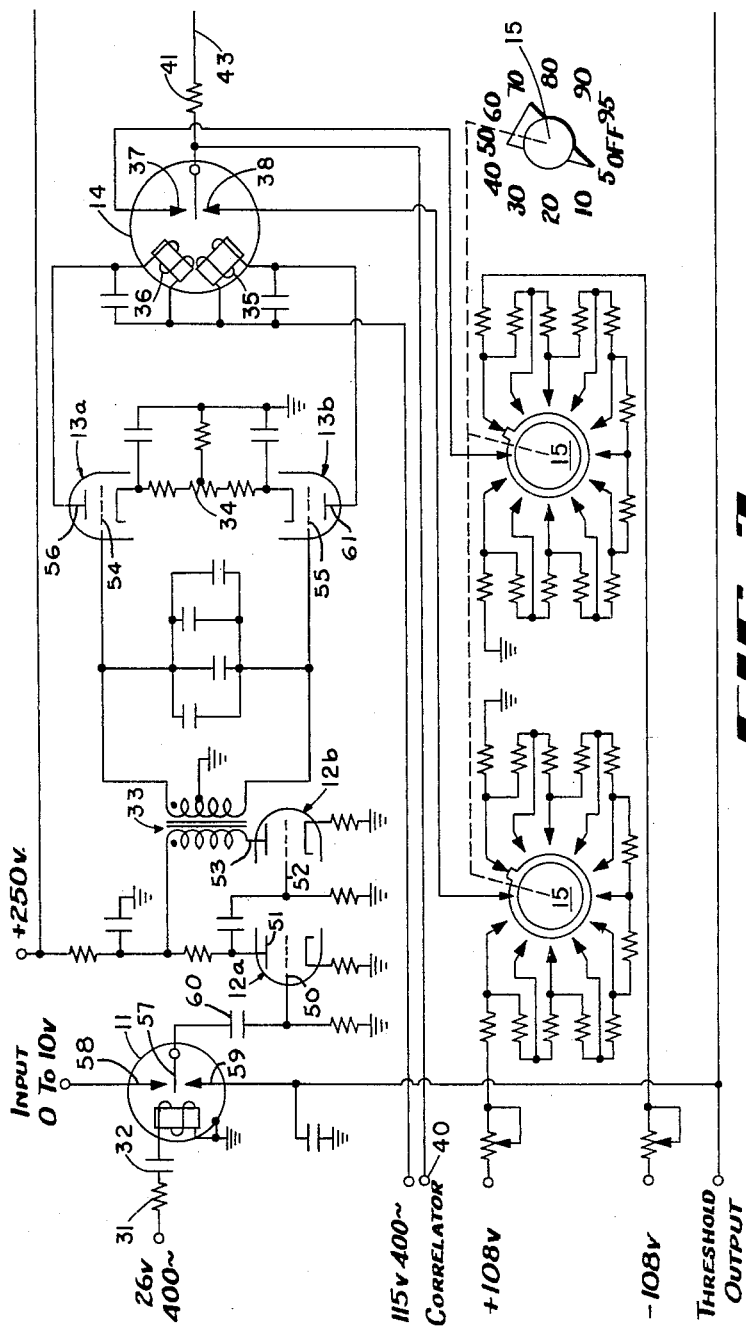

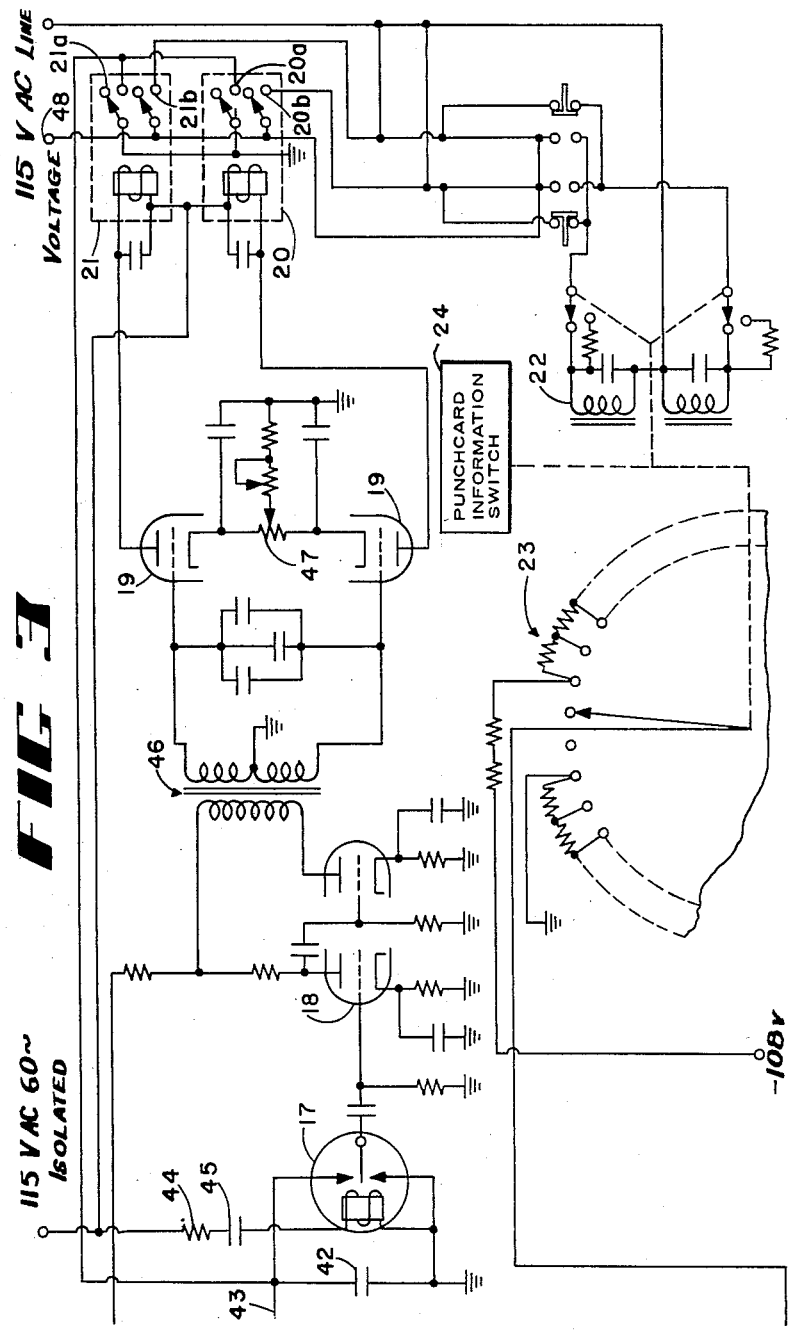

United States Patent Office 2,905,888
Patented Sept. 22, 1959

2,905,888

AMPLITUDE DISTRIBUTION ANALYZER

Charles S. Carney, Marion, Iowa, assignor to Collins Radio Company, Cedar Rapids, Iowa, a corporation of Iowa Application April 8, 1957, Serial No. 651,502

7 Claims. (Cl. 324—68)

This invention relates to amplitude distribution analyzers and more particularly to such analyzers which automatically determine the statistical distribution of random amplitude variations in selected input signals.

Statistical determinations of amplitude variations of electronic signals which have unpredictable and greatly varied amplitude differences generally have involved much time and labor and, consequently, were expensive. To do the necessary computations amplitude distribution analyzers which can determine what exact amplitude of signal is exceeded a given percentage of time are required. Such computations or analyses involves three variables: the amplitude exceeded, the absolute time, and the percentage of time. Amplitude exceeded may be expressed in decibels or microvolts. Time may be expressed in days, hours, or minutes, while percentage of time has no units inasmuch as it is a pure ratio. In the prior computation methods it has been necessary to assign arbitrary constant values to one of these variables while the other two are continuously varied. This same assignment of values has been carried out in one embodiment of this invention. The output from the distribution analyzer of this invention is usually expressed in two-dimension configuration graphical form in which the percentage of time has been held constant at an arbitrary position value while the signal value exceeded and the absolute time are varied. For a detailed explanation of amplitude distribution analysis, see the article by Irvin H. Gerks in the November 1951 issue of the "Proceedings of the Institute of Radio Engineers" entitled "Propagation at 412 Megacycles From A High Powered Transmitter."

This invention provides an amplitude distribution analyzer which will automatically analyze the distribution of random amplitude variations of an input signal. This invention is generally utilized in connection with a recording oscillograph. This invention may also be utilized with a correlator which determines the relationship between two random input signals and indicates the information on a meter. The recorder and the correlator devices are well known in the art and will not be described herein.

It is an object of this invention to provide a stable and compact amplitude distribution analyzer. It is a further object of this invention to provide an economical means of analyzing transmission loss despite rapid fluctuations of the range of amplitudes of the signal. It is a still further object of this invention to provide an amplitude distribution analyzer capable of computing simultaneously five discrete signal levels which are exceeded at a chosen percent of an absolute time value. It is another object of this invention to provide an amplitude distribution analyzer which minimizes stability errors and yet retains good reliability. It is still another object of this invention to provide an amplitude distribution analyzer which has a more rapid response time than prior analyzers.

These and other objects of this invention will become apparent when the following description is read in conjunction with the accompanying drawings in which, Figure 1 is a block diagram of one embodiment of the analyzer of this invention, Figure 2 is a detailed schematic diagram of a portion of one embodiment of this invention, and Figure 3 is a detailed schematic diagram of the remaining portion of one embodiment of this invention.

Referring now to Figure 1, the input signal is applied to the 400-cycle chopper 11. This input signal is shown as coming from a distribution channel and is actually a voltage from an automatic volume control of an associated receiver which is a measure of field strength. This input signal is compared in the 400-cycle chopper 11 with the threshold output voltage which comes from the threshold switch 23. This chopper is operated by a 400-cycle signal which is obtained from a commercially available 400-cycle power supply. If there is a difference in potential between the input signal and the threshold voltage applied to the chopper 11, a 400-cycle square wave output signal is generated by the chopper 11.

This square wave output signal is applied to the input amplifier 12 and the amplified output from the amplifier 12 is applied to the phase detector 13. The phase detector 13 chooses one of two output signals which are connected to two windings on the integrator timing relay 14. The integrator timing relay also receives direct current signals of a predetermined voltage ratio from the percentile level selector 15. The output from the integrator timing relay, which is a combination of the difference in amplitude between the input signal voltage and the threshold voltage, and the voltage ratios applied by the percentile level selector is applied to integrator circuit 16. This integrator circuit generates an error voltage which is applied to the 60-cycle chopper 17.

The output signals from the integrator timing relay are also applied to the correlator without passing through the integrator circuit. This means that the input signals from two of these percentile computer channels are applied to the correlator while the relationship between these input signals is determined.

The 60-cycle chopper 17 generates a 60-cycle square wave output signal which is amplified in error amplifier 18 and applied to the phase detector 19. When the error voltage which is applied to the chopper 17 reaches a predetermined level, the phase detector energizes one of the phase positioning relays 20 and 21. The phase positioning relays 20 and 21 will be selectively energized depending upon the polarity of the difference of the error voltage which has come from the chopper 11.

When either of the phase positioning relays are energized, a first set of contacts shorts the error signal to ground so that the analyzer may once again begin to generate a new error signal. This first error signal is utilized to energize the desired phase positioning relays thereby closing contacts to apply a voltage to actuate the stepping switch 22. The stepping switch 22 is a bi-directional stepping switch, and energization of relay 20 steps switch 22 in one direction while energization of relay 21 steps switch 22 in the opposite direction.

Mechanically coupled to the switch 22 are two sets of switch contacts, the threshold switch 23 and the punched card information switch 24. The threshold switch 23 is connected to a source of direct current voltage and consists of a plurality of resistance elements so that for each position a different threshold output voltage is generated. This new output voltage is then applied to the chopper 11 for comparison with the signal input.

The punched card information switch 24 is utilized to provide card punching information so that a permanent percentile signal record may be kept in card-file form.

This invention provides a self-correcting threshold condition which is more precise and results in better stability of the operating circuit than an arbitrary adjusting threshold voltage.

Referring now to Figures 2 and 3, a detailed circuit diagram of one embodiment of this invention is depicted. The input voltages applied to one of the contacts of the 400-cycle chopper 11 are indicated as having a value of from zero to ten volts. This input signal once again, as described above, comes from a receiver and generally from the automatic volume control circuit of this receiver. The other contact of this chopper 11 has the threshold output voltage applied thereto. The relay coil on chopper 11 has a 400-cycle voltage applied through resistance 31 and capacitance 32. This resistance and capacitance network serves as a phase shifting circuit for the 400-cycle voltage and synchronizes the 400-cycle voltage applied to the chopper 11 with the 400-cycle voltage applied to the plates of the phase detector 13. The output voltage from the chopper 11, which is a 400-cycle square wave depending upon the difference in potential between the signal input and the threshold output voltage, is applied to the grid of the amplifier 12.

The output signal from the amplifier 12 is coupled by the transformer 33 to the phase detector 13. The resistance elements or potentiometer 34 in the common cathode circuit of the phase detector 13 may be adjusted to balance the two sections of the phase detector. The plate circuits of the phase detector include the windings 35 and 36 of the polarized timing relay 14. Relay 14 may be a single-pole, double-throw relay whose movable arm maintains contact with one of the fixed contacts until the movable arm is pulled to the opposite contact by the positive action of the other winding. The polarized windings are energized when the signal input differs from the threshold output voltage by a value of at least $\frac{1}{100}$ of a volt. The operation of the foregoing circuit can be explained if it is assumed that when the 400 supply voltage on chopper 11 is on the positive half of its cycle the relay portion is making contact with the input contact 58, and also if it is assumed that the input voltage is higher than the threshold voltage. Under the above set of assumptions, the output voltage from the chopper 11 will be in phase with the 400 supply voltage.

Tube portions 12a and 12b amplify the square wave as a standard resistance coupled amplifier. The signal from armature 57 will pass through capacitor 60 to the grid 50 of tube portion 12a. The amplified signal from plate 51 of tube portion 12a passes to the grid 52 of tube portion 12b and is further amplified and finally appears across the secondary of transformer 33. Because the center tap of the secondary of transformer 33 is grounded, the output on grid 54 of tube portion 13a would be in phase with the 400 supply voltage and the output on grid 55 would be 180° out of phase. Since the 400 supply voltage is also impressed on each of the plates 56 and 61 of tube 13, tube portion 13a will conduct because both grid 54 and plate 56 are positive during the positive half of the 400 cycle supply voltage and will energize winding 36 of relay 14. However the tube portion 13b will not conduct since its grid will be going negative during this portion of the cycle. During the last half of the cycle, neither tube portion will conduct since both plates will be negative.

If the input 58 to the chopper 11 were more negative than the threshold voltage, a 180° out-of-phase square wave voltage will be developed, subsequently amplified, and applied to phase detector 13. However, the phase of the square wave voltages on the grids would be reversed, hence tube portion 13b would conduct, energizing winding 35 of relay 14.

Thus amplifier 12 in cooperation with phase detector 13 and integrator timing relay 14, will select from voltage selector switch 15 a preset positive or negative voltage which depends upon the relationship of the phase between the 400 supply voltage and the phase of the square wave voltage developed by the chopper 11. A negative direct current voltage is applied to one fixed contact 37 of the relay 14 and a positive direct current voltage is applied to the other fixed contact 38 of relay 14. The ratio between these positive and negative voltages is determined by the percentile level switch 15. This switch includes two voltage divider networks which apply fixed voltage ratios to the contacts of the relay 14. In one embodiment of this invention, if the percentile level selected by switch 15 were 20 percent, then the negative voltage would be 90 volts and the positive voltage would be 27 volts.

If the signal input is more negative than the threshold output voltage by at least $\frac{1}{100}$ of a volt, the movable arm of the timing relay 14 will be pulled to the negative contact 38. The output of relay 14 will consist of positive and negative voltages whose amplitude is determined by the percentile level voltage selector switch 15 whose duration is determined by the fluctuations of the input signal voltage above and below the threshold output voltage. The output from relay 14 is connected directly to the correlator referred to above, and is shown as the output connection 40. Also, the output signal from the relay 14 is applied through resistance 41 and capacitance 42 by the line 43 to the fixed contacts of the 60-cycle chopper 17. The relay coil of the 60-cycle chopper is fed from an isolated 115 volts, 60-cycle alternating current source not shown. This source of voltage is commercially available and will not be described further herein. The resistance 41 and the capacitance 42 constitute an integrator circuit which will determine the error voltage. The error voltage is a representation of the error in the threshold output voltage.

The integrator circuit determines the percentage level by determining the charge over a certain period of time on the integrating capacitor 42. The integrating circuit of this invention is based on the premise that for a given percentile level the voltage across the integrating capacitor can be made to equal zero. This may be accomplished by charging the capacitor in a positive direction during the time the input signal is above the threshold voltage and charging the capacitor in a negative direction during the time the input signal is below the threshold voltage. In the particular embodiment of this invention which was caused to be constructed, it was arbitrarily determined that the charging and discharging voltages on the capacitance would be a positive 45 volts and a negative 45 volts at the 50-percentile point. It was further arbitrarily determined that for all percentiles above 50 percent the positive voltage would be 45 volts and the negative voltage some value greater than 45 volts. Conversely, for all percentiles below 50 percent the negative voltage would be 45 volts and the positive voltage some greater value. The voltages required for each percentile level may be determined from the following relationship:

$$(-)\frac{E+}{E-}=\frac{T-}{T+}$$

The quantity of charge Q accumulated on the capacitor 42 is equal to the current times the time the current is applied. This may be expressed as, $Q=IT$. The resistor and the capacitor in the integrating circuit are normally large in value. The large resistance furnishes a current to the capacitor 42 which is proportional to the applied voltages. If the voltages applied to the integrating circuit are in the form of square wave pulses having durations of predetermined time, the quantity of charge accumulated on the capacitor 42 may be determined by mathematical analysis. If the positive charge equals the negative charge over a period of time, it is obvious that the total charge is zero. With the voltage across the capacitance known to be proportional to the accumulated charge on the capacitor, the accumulated voltage will also be zero.

The ratios of the voltage amplitudes are determined by the percentile level selected. The time duration that these signals are applied are determined by the length of time that the signal input voltage is above or below the threshold output level. The voltage accumulated on the capacitor 42 is called the error voltage and is a representation of the error in the threshold output voltage. In the specific embodiment constructed, the loading effects of the chopper 17 or the integrating network are minimized by keeping its operating part close to ground potential.

The output signal from the integrating network is applied to the fixed contacts of the chopper 17. The 60-cycle voltage is applied to the chopper through the phase shifting network consisting of resistance 44 and capacitance 45. This is to synchronize the supply voltage applied to the relay coil of the chopper 17 with the supply voltage applied to the phase detector 19. The output signal from the chopper 17 is applied to the grid of the error signal amplifier 18 and the amplified output signal is coupled to the phase detector 19 by the transformer 46. This phase detector 19 has a potentiometer 47 in the common cathode circuit to permit adjusting the sensitivity and the balance of the phase detector 19.

The plate circuits of phase detector 19 each include a relay winding of the individual phase positioning relays 21 and 20. Each of these phase positioning relays includes a plurality of fixed contacts. When the integrator output voltage reaches a predetermined value, the phase detector 19 will energize the winding of one of the phase positioning relays. One set of the fixed contacts 21a or 20a on the respective phase positioning relays shorts the error signal to ground. The second set of fixed contacts 21b and 20b on the respective phase positioning relays operates as a series switch and energizes the relay coil of the stepping switch 22. This means that the energizing voltage is applied from the contact 48 through the fixed contacts 21b or 20b to the windings of the stepping switch 22.

The stepping switch 22 is mechanically linked to the punch card information switch 24 and the threshold switch 23. The threshold switch 23 is a voltage divider circuit and applies a different threshold output voltage to the 400-cycle chopper for each setting of the switch. The threshold output voltage from the divider circuit 23 is also applied to the automatic timer which is not a part of this invention.

It is seen that the phase detector 19 will operate phase positioning relays 21 or 20 depending upon the polarity of the error signal developed and applied to the chopper 17. Thus, the direction of movement of the stepping switch is controlled. The stepping switch controls movement of the threshold voltage divider circuit. If the threshold voltage has been too small for stable comparison with the input signal, this computer automatically adjusts the threshold voltage to the proper value for comparison with the input signal.

Although this invention has been described with respect to a particular embodiment thereof, it is not to be so limited as changes and modifications may be made therein which are within the full intended scope of the invention as defined by the appended claims.

What is claimed is:

1. An amplitude distribution analyser for analyzing a signal to determine the percentage of time that a selected amplitude is exceeded by the signal comprising comparator means for comparing the signal with a first reference voltage, means for generating said first reference voltage, phase detector means connected to the output of said comparator means to determine the phase of the output signals from said comparator means, timing means, means for synchronizing said comparator means with said phase detector means, means for generating a second reference voltage, said second reference voltage and the output signals from said phase detector means connected to said timing means; said timing means producing output signals whose polarity, amplitude and duration are determined by the input signals to said timing means; integrator means connected to said timing means for integrating the output signals from said timing means over a predetermined period of time, and means responsive to the output singals from said integrating means for varying said first reference voltage whereby an amplitude analysis of the signal in terms of the amplitude exceeded by the signal a given percentile of time is continuously generated.

2. An amplitude distribution analyser for analyzing the amplitude of an input signal which is exceeded a predetermined percentile of time comprising comparator means, said comparator means receiving said input signals and first reference voltage signals, said first reference voltage signals generated by a first voltage generating means, output signals generated by said comparator means when said input signals and said first reference voltage signals are of dissimilar potentials, phase detector means detecting the phase of the output signals from said comparator means, timing means, a second source of reference signal voltages, a selected one of said second reference signal voltages and the output signals from said phase detector means connected to said timing means; said timing means generating from said input signals output signals comprising voltage pulses having varied polarity, amplitude and duration; integrator means connected to said timing means, said integrator means integrating output signals from said timing means over a predetermined time interval, and means including switch means responsive to the output from said integrator means for varying said first reference voltage signal generating means to provide an analysis of said input signal proportional to the amplitude exceeded by said input signal a given percentile of time.

3. An amplitude distribution analyser for analyzing the amplitude which is exceeded by an input signal a selected percentage of time comprising a first comparator means, means for generating first reference voltage signals, said signals having variable amplitudes, said first reference voltage signals and said input signals connected to said first comparator means, said first comparator means producing an alternating current output signal of a predetermined frequency, a phase detector, means for synchronizing said phase detector with said first comparator means, the output signals from said first comparator means connected to said phase detector, said phase detector generating output signals dependent upon the phase of the output signals from said first comparator means, means for generating second reference voltage signals, timing means, the output signals from said phase detector and said second reference voltage signals applied to said timing means; output signals generated by said timing means in the form of pulses whose polarity, amplitude and duration are variable; said output signals from said timing means connected to a first integrator means, said first integrator means integrating said output signals from said timing means over a predetermined period of time to produce a control signal voltage; and means including a second comparator means, a second phase detector means, and switch means responsive to said control voltage signals for varying the amplitude of said first reference voltage signals whereby an analysis of said input signal in terms of the percentage of time that the input signal exceeds a preselected amplitude is generated.

4. An amplitude distribution analyser for analyzing an input signal in terms of the percentage of time said input signal exceeds a preselected amplitude comprising a first comparator means, means for generating a first reference signal voltage, said first reference signal voltage being variable in amplitude, said first comparator means including input means connected to said input signal and said first reference signal voltage, output signals from said first comparator means being alternating current signals of a selected frequency, a first phase detector, said first phase detector receiving said output signals from said first comparator means as input signals and generating therefrom output signals dependent upon the phase of said input signals, means for generating a plurality of second reference signal voltages, a desired one of said second reference signal voltages being selectively chosen, a timing means, said chosen second reference signal voltage and said output signals from said first phase detector applied to said timing means; said timing means generating output signals having variable polarity, amplitude and duration; integrating means, the output signals from said timing means connected to said integrating means, said integrating means integrating said output signals from said timing means over a predetermined period of time thereby generating a control signal; and means responsive to said control signal comprising a second comparator means, a second phase detector means, and phase positioning relays and switches to vary the amplitude of said first reference signal voltage whereby an accurate analysis of the input signal voltage in terms of the percentage of time that said voltage exceeds a given amplitude is generated.

5. An amplitude distribution analyser for analyzing an input signal in terms of percentage of time said input signal exceeds a selected amplitude comprising a first comparator means, means for generating a first reference signal voltage, means for varying the amplitude of said first reference signal voltage, said first comparator means including input means, said input signal and said first reference signal voltage connected to said input means, output signals from said first comparator means being alternating current signals of a selected frequency, a first phase detector, said first phase detector receiving the output signals from said first comparator means as input signals and generating therefrom output signals dependent upon the phase of said input signals, means for generating a plurality of second reference signal voltages, means for selectively choosing a desired one of said second reference signal voltages, said chosen one of said second reference signal voltages correlated to the desired percentage of time for said analysis, a timing means, said selectively chosen second reference signal voltage and said output signals from said phase detector connected to said timing means; said timing means generating output signals having a variable polarity, amplitude and duration; integrating means, the output signals from said timing means connected to said integrating means, said output signals from said timing means also being selectively connected to means for determining the relationship of two random input signals, said integrating means integrating said output signals from said timing means over a predetermined period of time thereby generating a control voltage; and means responsive to said control signal comprising a second comparator means, a second phase detector means, and phase positioning relays and switches to actuate said means for varying the amplitude of said first reference signal voltage whereby an accurate analysis of the input signal voltage in terms of the percentage of time that said voltage exceeds a given amplitude is generated.

6. An amplitude distribution analyser for analyzing an input signal in terms of percentage of time said input signal exceeds a selected amplitude comprising a first comparator means, means for generating a first reference signal voltage, means for varying the amplitude of said first reference signal voltage, timer means, said first reference signal voltage connected to said timer means, said first comparator means including input means, said input signal and said first reference signal voltage connected to said input means, output signals from said first comparator means being alternating current signals of a selected frequency, a first phase detector, said first phase detector receiving the output signals from said first comparator means as input signals and generating therefrom output signals dependent upon the phase of said input signals, means for generating a plurality of second reference signal voltages, means for selectively choosing a desired one of said second reference signal voltages, said chosen one of said second reference signal voltages correlated to the desired percentage of time for said analysis, a timing means, said selectively chosen second reference signal voltage and said output signals from said phase detector connected to said timing means; said timing means generating output signals having variable polarity, amplitude and duration; integrating means, the output signals from said timing means connected to said integrating means, means for selectively connecting said output signals from said timing means to means for determining the relationship of two random input signals, said integrating means integrating said output signals from said timing means over a predetermined period of time thereby generating a control signal; and means responsive to said control signal comprising a second comparator means, a second phase detector means, an information recording means, and phase positioning relays and switches to actuate said means for varying the amplitude of said first reference signal voltage and to actuate information recording means for recording the changes in the first reference signal voltage whereby an accurate analysis of the input signal voltage in terms of the percentage of time that said voltage exceeds a given amplitude is generated as said first reference signal voltage.

7. An amplitude distribution analyser for analyzing an input signal in terms of percentage of time said input signal exceeds a selected amplitude comprising a first comparator means, means for generating a first reference signal voltage, means for varying the amplitude of said first reference signal voltage, timer means, said first reference signal voltage connected to said timer means, said first comparator means including input means, said input signal and said first reference signal voltage connected to said input means, output signals from said first comparator means being alternating current signals of a selected frequency, a first phase detector, said first phase detector receiving the output signals from said first comparator means as input signals and generating therefrom output signals dependent upon the phase of said input signals, means for generating a plurality of second reference signal voltages, means for selectively choosing a desired one of said second reference signal voltages, said chosen one of said second reference signal voltages correlated to the desired percentage of time for said analysis, a timing means, said selectively chosen second reference signal voltages and said output signals from said phase detector connected to said timing means; said timing means generating output signals having variable polarity, amplitude and duration; integrating means, the output signals from said timing means connected to said integrating means, means for selectively connecting said output signals from said timing means to means for determining the relationship of two random input signals, said integrating means integrating said output signals from said timing means over a predetermined period of time thereby generating a control signal; and means responsive to said control signal comprising a second comparator means producing an alternating current signal of a selected frequency, a second phase detector means, and phase positioning relays and switches to actuate said means for generating the amplitude of said first reference signal voltage whereby an accurate analysis of the input signal voltage in terms of the percentage of time that said voltage exceeds a given amplitude is generated as said first reference signal voltage.

References Cited in the file of this patent

UNITED STATES PATENTS

| | | |
|---|---|---|
| 2,079,064 | Burrill | May 4, 1937 |
| 2,641,931 | Wild | June 16, 1953 |
| 2,715,209 | Williams | Aug. 9, 1955 |
| 2,765,703 | Ward | Oct. 9, 1956 |